No. 856,680. PATENTED JUNE 11, 1907.
C. E. CAMPBELL.
ROTARY DRESSING IMPLEMENT.
APPLICATION FILED AUG. 4, 1905.
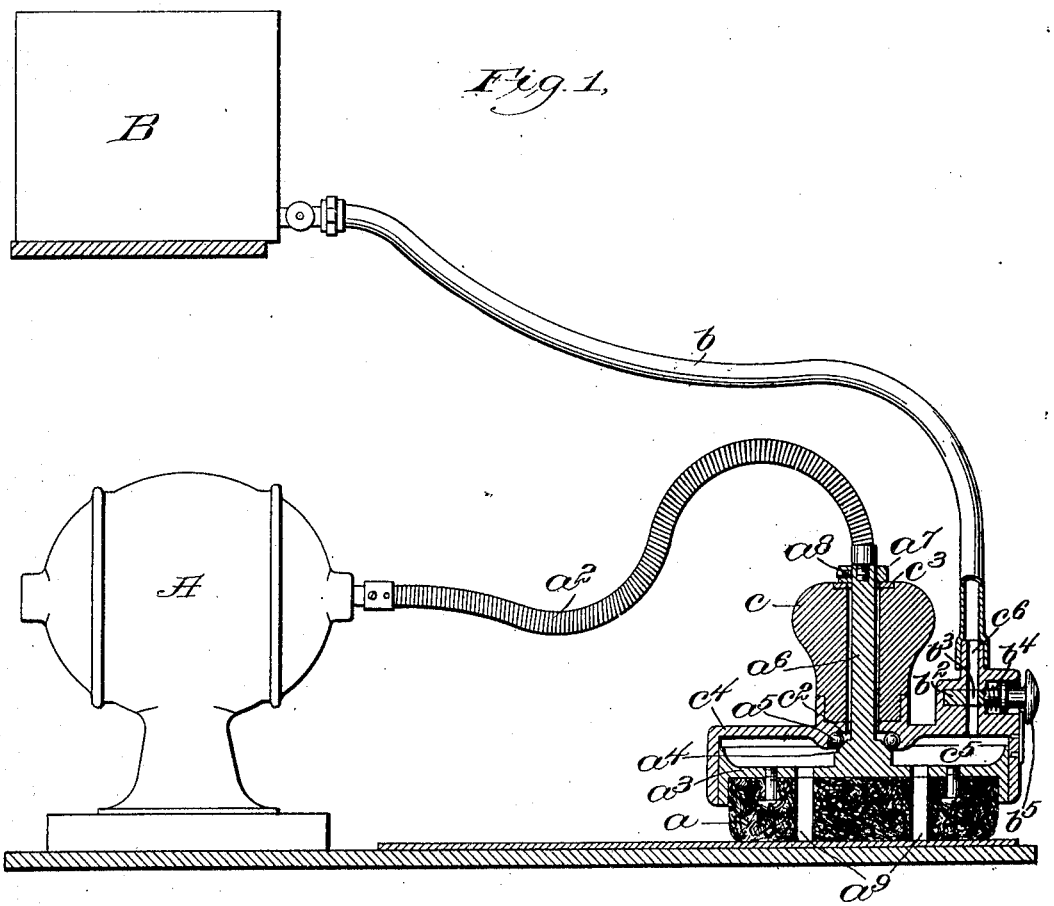
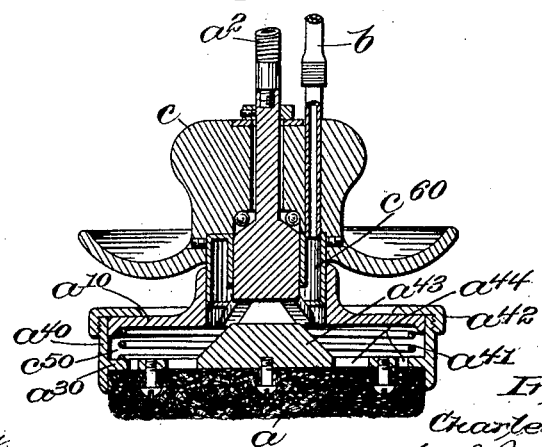

UNITED STATES PATENT OFFICE.

CHARLES E. CAMPBELL, OF LYNN, MASSACHUSETTS.

ROTARY DRESSING IMPLEMENT.

No. 856,680.    Specification of Letters Patent.    Patented June 11, 1907.

Application filed August 4, 1905. Serial No. 272,770.

*To all whom it may concern:*

Be it known that I, CHARLES E. CAMPBELL, a citizen of the United States, residing in Lynn, in the county of Essex and State of Massachusetts, have invented an Improvement in Rotary Dressing Implements, of which the following description, in connection with the accompanying drawings, is a specification, like letters on the drawings representing like parts.

The present invention relates to a rotary dressing implement, and is shown as embodied in an implement adapted for applying dressing to leather, the object of the invention being to produce an implement partly mechanical and partly manipulated by hand so as to combine the advantages of a machine with the advantages of hand manipulation.

To these ends, the implement embodying the invention comprises an applying member or brush, as it will be hereinafter referred to, combined with a motor of any suitable or usual kind for producing a rotary movement of the brush, and a flexible driving connection between the motor and the brush so that the latter can be moved about upon the leather, or other material which is being dressed, and the pressure and length of time of application to any one part of the material intelligently regulated by the operator. The brush is further arranged to be supplied with liquid through a flexible tube, and the supply of liquid may be controlled by a valve operated in any suitable or usual way.

Figure 1 is an elevation of an implement embodying the invention, the brush portion being shown on an enlarged relative scale, and in vertical section; and Fig. 2 is a sectional view of the brush portion showing a modification.

The brush $a$ is herein shown as a disk of felt, or similar material, capable of being saturated with liquid, such as dressing for leather, and is arranged to be rotated mechanically, as by an electro-motor A. In order that the brush, while rotating, may be moved over the surface to which the liquid is applied, and skilfully manipulated so far as relates to pressure and length of time employed in treating any one part of the surface, the said brush is connected with the shaft of the motor by means of a flexible shaft $a^2$ which may be of any suitable or usual construction. At the same time, the brush $a$ is supplied with liquid through a flexible pipe $b$ from a reservoir B, there being a cut-off to control the supply.

In the construction shown in Fig. 1, the rotary brush is mounted in suitable bearings in a handle portion $c$, the brush proper being connected with a bearing member $a^3$ shown as having a conical portion $a^4$ arranged to bear upon anti-friction balls $a^5$ contained in ball races $c^2$ formed in the handle portion. The bearing portion $a^3$ is directly connected with a solid shaft $a^6$ which projects through the handle member $c$, the brush and shaft being maintained in position by means of a collar $a^7$ secured to the shaft as by a set screw $a^8$, the handle portion $c$ being shown as provided with a hardened washer $c^3$ for the collar $a^7$ to bear upon. The handle portion $c$ is further provided with a casing $c^4$ which incloses the brush proper $a$, the space within the said casing forming a chamber $c^5$ to receive the liquid or dressing which is to be applied to the material. The flexible pipe $b$ opens into the said casing, the supply of liquid being controlled in this construction by means of a valve $b^2$, herein shown as a cut-off member provided with an opening $b^3$, the said member being movable transversely across the tubular portion $c^6$ of the member $c^4$ with which the flexible pipe $b$ is connected, and being normally held closed by means of a spring $b^4$. In the drawing, the valve is shown as open, the valve proper being provided with a finger piece or knob $b^5$ by means of which the valve may be opened at the will of the operator. In order that the liquid may be quickly applied to the surface of the material under treatment, the brush $a$ in this construction is shown as provided with ports or openings $a^9$ leading directly through the brush from the chamber, so that the liquid will flow through as soon as the valve $b^2$ is opened.

While the controlling valve $b^2$ is a practicable expedient, it may, in some cases, be desirable, when liquid is used, to regulate the flow thereof in other ways, and, in Fig. 2, a modified construction is shown in which the supply of liquid is controlled by pressure upon the handle $c$, the said handle and the brush being movable with relation to each other. As shown in Fig. 2, the handle portion $c$ is provided with an annular channel $c^{60}$ open at the bottom, and in communication at the top with the tube $b$. The said channel fits, approximately, in an annular opening formed in the top of the rotating member $a^{10}$ which, in this case, instead of being directly connected with the brush $a$, is separate therefrom, but arranged to be brought into connection with the brush by pressure upon the handle $c$. The liquid supplying chamber $c^{60}$, in this case, is formed by providing the brush holding portion $a^{30}$ with an upwardly projecting flange $a^{40}$ which fits around the disk portion of the rotating member $a^{10}$, there being a spring $a^{41}$ interposed between the top of the brush member and the said disk portion. The brush, in this case, is held in position by means of an annular collar $a^{42}$ shown as screwed upon the outside of the flange $a^{40}$, so as to overlie the disk portion of the driving member. Projecting upward from the top of the brush-holding portion $a^{30}$ is an engaging member $a^{43}$ arranged to fit a corresponding recess in the disk portion of the driving member, the said recess being below the liquid supplying channel $c^{60}$ and provided with openings for the flow of liquid into the chamber $c^{50}$. When the brush $a$ is in contact with the material, pressure upon the handle portion $c$ will force the driving portion $a^{10}$ and the brush holding portion into contact, thus causing the brush $a$ to rotate with the driving portion, and, at the same time, cutting off the supply of liquid by closing the openings through the driving portion. The disk which supports the brush is shown as provided with openings $a^{44}$, the brush itself, in this case, being shown as a solid mass of felt through which the liquid permeates, there being no direct openings through it, as in the construction shown in Fig. 1.

What I claim is:

1. A rotary dressing implement comprising a rotary brush; a motor; a flexible driving connection between said motor and said brush; a casing for said brush; and means for supplying said casing with dressing material.

2. The combination with a rotary brush; of a motor; a flexible shaft directly connected with said motor and said brush; a source of liquid; and a flexible tube leading from said source to said brush.

3. The combination with a rotary brush; of a handle constituting a bearing therefor; a chamber formed in said handle to receive dressing material; a flexible driving shaft connected with said brush; and means for supplying said chamber with dressing material.

4. The combination with a rotary brush; of a handle constituting a bearing therefor; a chamber formed in said handle to receive dressing material; a flexible driving shaft connected with said brush a reservoir for dressing material; and a flexible tube leading from said reservoir to said chamber.

In testimony whereof, I have signed my name to this specification in the presence of two subscribing witnesses.

CHARLES E. CAMPBELL.

Witnesses:
M. E. COVENEY,
HENRY J. LIVERMORE.